United States Patent
Khennache et al.

[19]

[11] Patent Number: 6,102,413

[45] Date of Patent: Aug. 15, 2000

[54] SNOWMOBILE STEERING SKI

[75] Inventors: Omar Khennache, Sherbrooke; Jérôme Chapdelaine, St-Élie; Nelson Beaulieu, Sherbrooke, all of Canada

[73] Assignee: Camoplast Inc., Sherbrooke, Canada

[21] Appl. No.: 09/004,111

[22] Filed: Jan. 7, 1998

[30] Foreign Application Priority Data

Jan. 15, 1997 [CA] Canada ................................. 2195166

[51] Int. Cl.⁷ ................................................ B62D 57/00
[52] U.S. Cl. ............................................................ 280/28
[58] Field of Search ................................. 180/182, 183, 180/184, 190, 191, 192, 193; 114/283; 440/11; 280/13, 16, 26, 28

[56] References Cited

U.S. PATENT DOCUMENTS

| | | | |
|---|---|---|---|
| 3,643,979 | 2/1972 | Richards | 280/28 |
| 3,817,544 | 6/1974 | Labelle | 180/182 |
| 4,681,725 | 7/1987 | Maruyama | 280/610 |
| 5,040,818 | 8/1991 | Metheny | 280/609 |
| 5,145,201 | 9/1992 | Metheny | 280/609 |
| 5,165,709 | 11/1992 | Jacques | 280/28 |
| 5,222,749 | 6/1993 | Bergstrom | 280/28 |
| 5,249,819 | 10/1993 | Mayr | 280/602 |
| 5,344,168 | 9/1994 | Olson et al. | 280/28 |
| 5,443,278 | 8/1995 | Berto | 280/28 |
| 5,599,030 | 2/1997 | Campbell et al. | 280/28 |
| 5,673,926 | 10/1997 | Gauer | 280/610 |
| 5,687,983 | 11/1997 | Feketa et al. | 280/609 |
| 5,853,061 | 12/1998 | Yamamoto et al. | 180/190 |
| 6,012,728 | 1/2000 | Noble | 280/28 |

*Primary Examiner*—Brian L. Johnson
*Assistant Examiner*—Michael Britton
*Attorney, Agent, or Firm*—Boyle Fredrickson Ziolkowski S.C.

[57] ABSTRACT

A snowmobile steering ski has an elongated one-piece blow molded body formed of polyethylene, preferably ultra high molecular weight polyethylene. The top wall of the body has raised portions defining hollow sections with the bottom wall and displays a central recessed area adapted to receive the lower end of a snowmobile steering component. A pair of fixation holes are provided in lateral sides of the recessed area for fixing the steering component to the ski while further fixation holes are provided in the bottom of the recessed area for fixing a wear bar to the under face of the body.

12 Claims, 6 Drawing Sheets

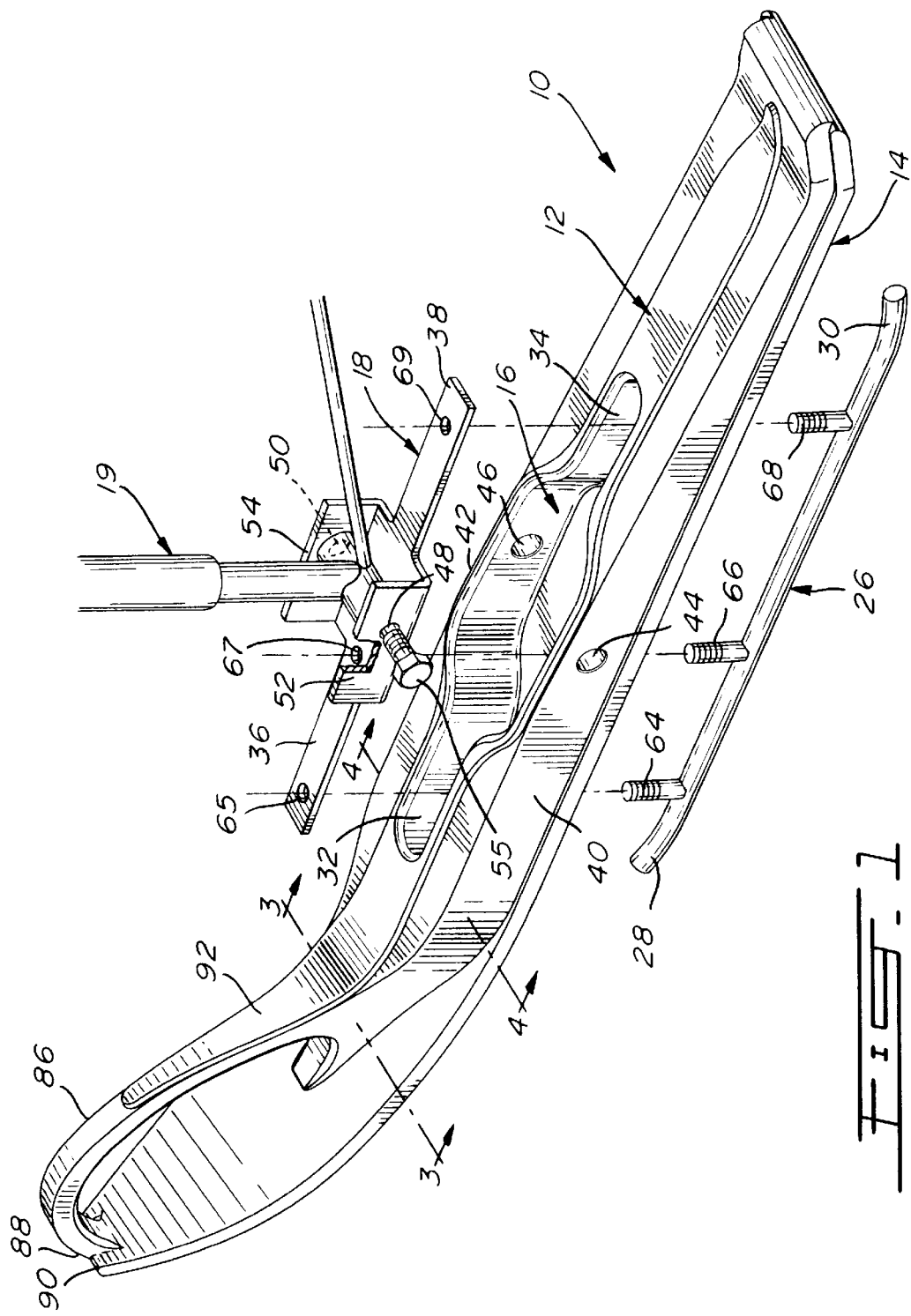

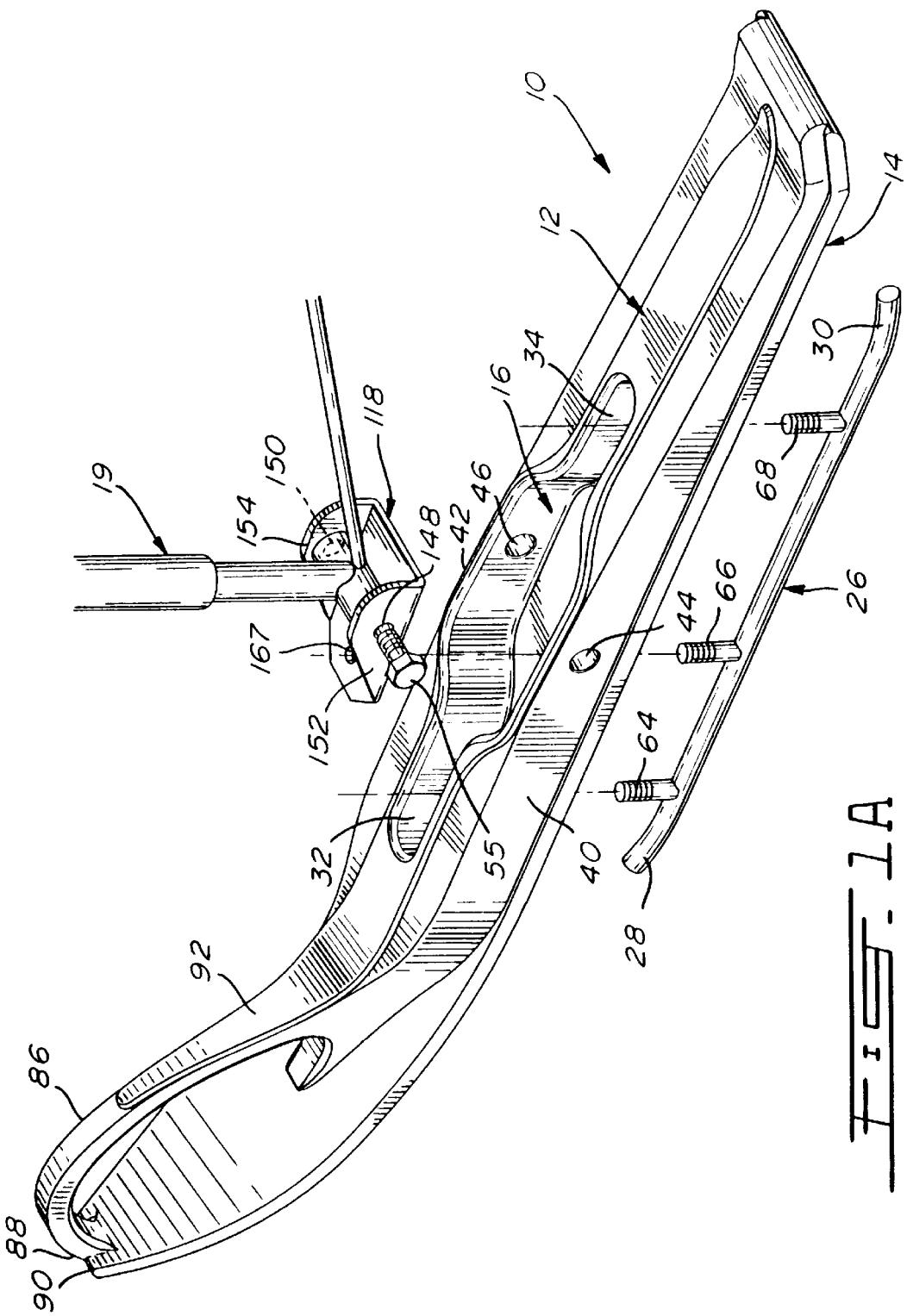

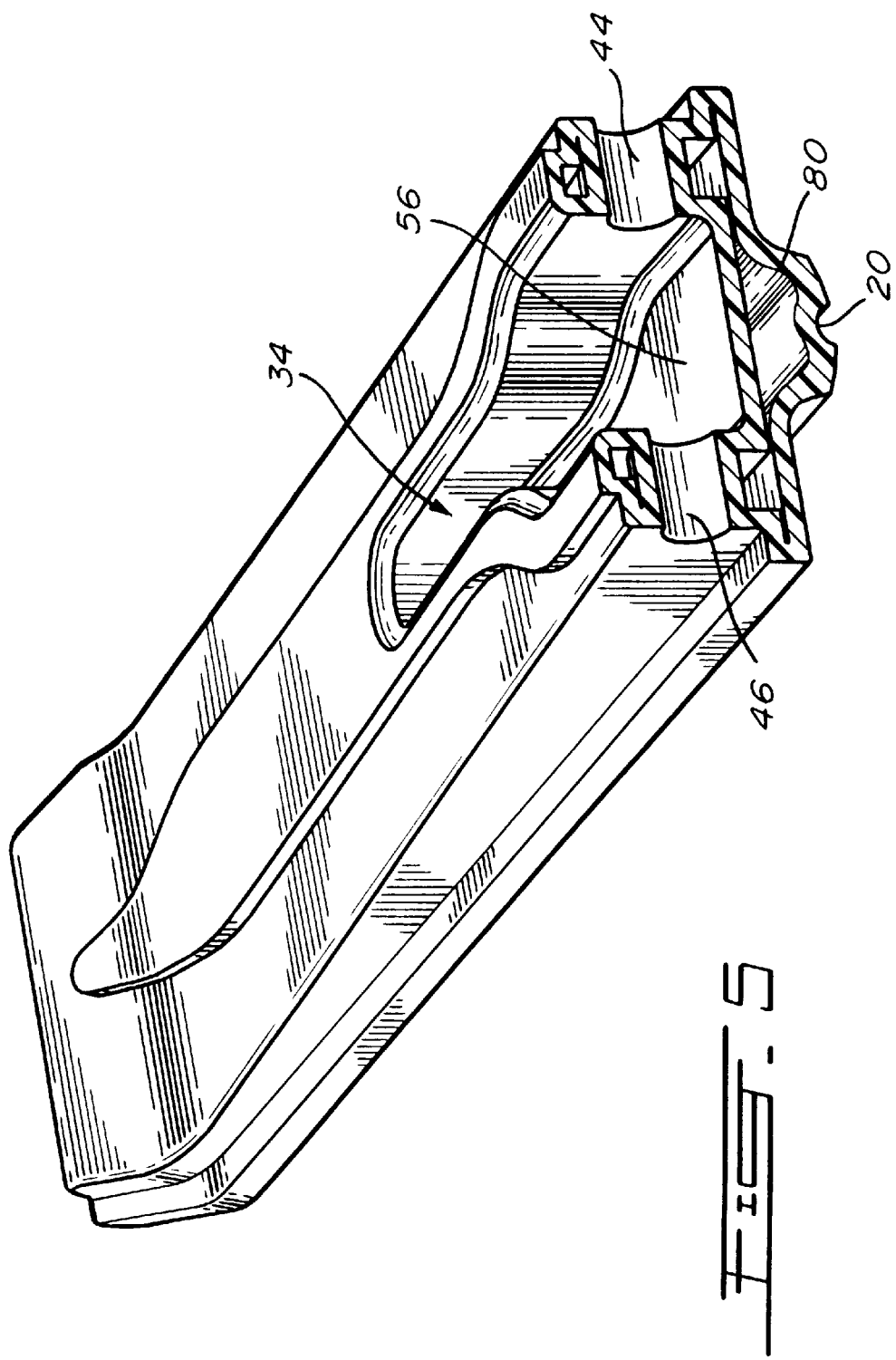

SNOWMOBILE STEERING SKI

FIELD OF THE INVENTION

The present invention pertains to a ski used for the steering of a snowmobile. More particularly, the present invention pertains to a one piece blow molded ski formed of polyethylene.

BACKGROUND OF THE INVENTION

Generally, snowmobile skis are made of metal, such as steel or aluminum. Snowmobile metal skis are found to show a higher wear than that of any kind of plastic skis and, when wear is important, snowmobile performance is significantly reduced. Metal skis have a tendency to stick onto the ice which thereby significantly increases friction forces which shorten the life of skis. This induces a higher drag between the metal skis and the ice, which leads to higher gas consumption. Also, the appearance of a worn metal ski depreciates its value.

In the last decade, many plastic ski designs have been developed and fabricated. Such skis may be found described in U.S. Pat. No. 5,040,818 issued Aug. 20, 1991 to Metheny, U.S. Pat. No. 5,165,709 issued Nov. 24, 1992 to Jacques and U.S. Pat. No. 5,443,278 issued Aug. 22, 1995 to Berto. It has been found that plastic skis show better overall riding performance than metal skis. All presently known plastic skis are produced using a process called compression molding with ultra high molecular weight polyethylene (UHMW-PE), which process has long production cycles. Compression molded plastic skis are much more expensive than metal skis because of this longer production cycle and of design limitations, such as wall thickness. Heavy metal frame works must be added to the ski skin for extra strength. However, upon front impact on these plastic skis, the metal frame works deform permanently, which results in the need to replace them.

Also, metal and plastic skis presently used require the incorporation of a separate handle to the overall assembly. In the above mentioned U.S. Pat. No. 5,165,709, the compression molded plastic ski has its front handle as part of the sole; however, an additional assembly operation is needed to bend back the handle and secure it to the sole end stiffener.

OBJECTS AND STATEMENT OF THE INVENTION

It is an object of the present invention to provide a snowmobile ski which overcomes the disadvantages and limitations of presently known methods of making plastic snowmobile skis by the compression molding process.

It is a further object of the present invention to provide a snowmobile steering ski which is lighter than presently used plastic end metal skis.

It is an other object of the present invention to provide a plastic snowmobile ski made by blow molding and wherein a handle is completely integrated to the assembly thereby eliminating assembly operations which are required in presently known metal and plastic skis.

The present invention therefore relates to a snowmobile ski which comprises an elongated one-piece blow molded body formed of polyethylene; the body has a top wall and a bottom wall, the top wall having raised portions defining hollow sections with the bottom wall. The raised portions display a central recessed area adapted to receive therein the lower end of a snowmobile steering component; this recessed area define opposite lateral sides in which fixation hole means are provided for fixing the steering component to the ski.

In one form of the invention, the body has a forward end and defines a handle having one end integrally formed with the forward end and an opposite end extending from the hollow sections of the ski.

In another form of the invention, second fixation holes are provided, during the blow molding process, in the bottom of the recessed area for fixing a wear bar to the under face of the body.

One preferred material is ultra high molecular weight polyethylene (UHMW-PE).

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 1 is a perspective exploded view showing a ski made in accordance with the present invention together with some of the steering components of a snowmobile and a wear bar;

FIG. 1a is a perspective exploded view showing another suspension plate which may be used with the ski of the present invention;

FIG. 5 is a cross sectional view taken along lines 5—5 of FIG. 4.

DETAILED DESCRIPTION OF THE INVENTION

Figure 2:
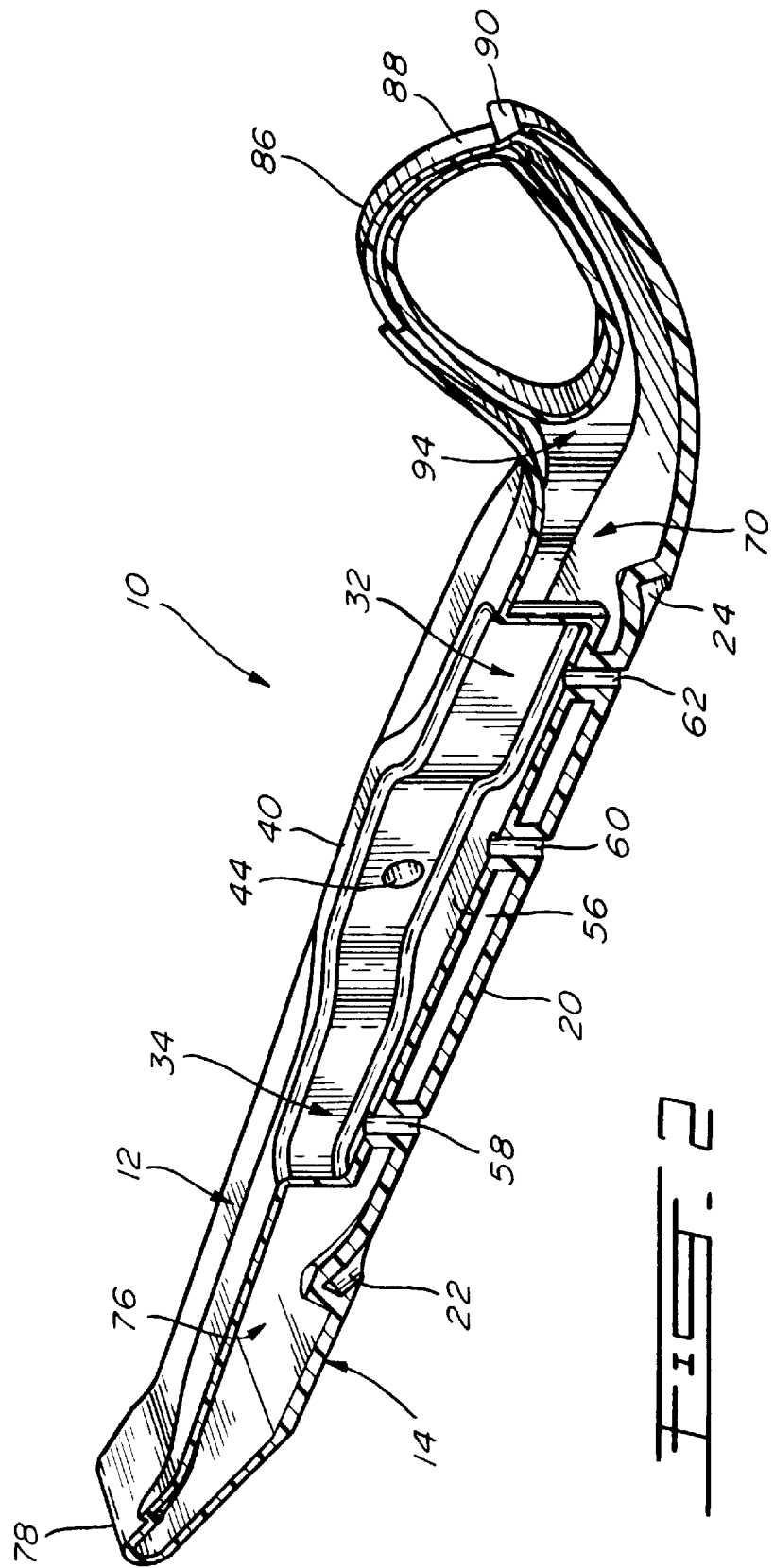
FIG. 2 is a longitudinal cross sectional view of the ski.

Referring to FIG. 1, there is shown a ski 10 which is used, either singly or in pair, for turning or steering a snowmobile (not shown). The ski consists of a one-piece elongated body formed by a process, called blow molding, using polyethylene such as high molecular weight polyethylene (HMW-PE) or, preferably, ultra high molecular weight polyethylene (UHMW-PE). Various additives may be used to improve wear resistance, including those which are mentioned in the above noted U.S. Pat. No. 5,165,709.

Body 10 has a top wall 12 and a bottom wall 14. As a result of the blow molding process, the top wall 12 is formed of raised portions with respect to the bottom wall thereby defining hollow sections (as described further hereinbelow). The top wall 12 displays a central recessed area 16 to receive therein a suspension plate 18 forming part of the steering components 19 of the snowmobile.

Figure 4:
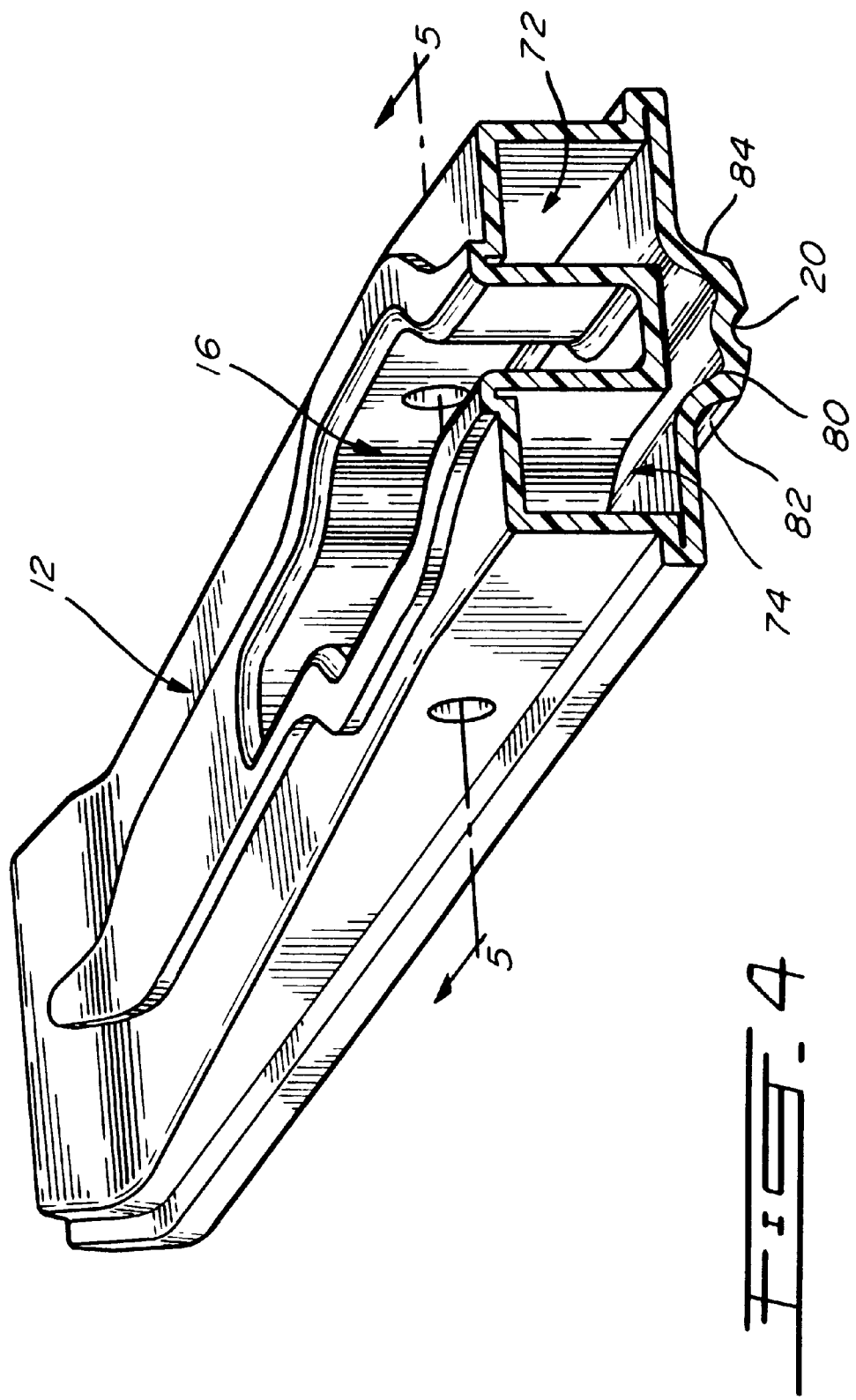
FIG. 4 is a cross sectional view taken along lines 4—4 of FIG. 1.

Referring also to FIGS. 2, 4 and 5, the bottom wall 14 has a narrow concave surface with opposite entering areas 22 and 24 to receive a correspondingly shaped wear bar 26 with its opposite end portions 28 and 30.

The central recessed area 16 of the top wall has front and rear portions 32 and 34 in which are received corresponding front and rear end portions 36 and 38 of the metallic plate 18. The central recessed area 16 also defines opposite sides 40 and 42, each having a corresponding hole 44, 46, which is axially aligned with a corresponding hole 48, 50 provided in ears 52 and 54 of the plate. A pair of bolts (one being shown as 55) is used to secure the steering components to the ski.

The bottom wall 56 of the recessed area 16 has three aligned holes 58, 60 and 62 allowing to receive therethrough threaded projections 64, 66 and 68 of the wear bar 26. The suspension plate also has three holes 65, 67, 69 which are so disposed as to be aligned with the holes 58, 60, 62 and receive the projections 64, 66, 68 of the wear bar. Nuts (not shown) secure the wear bar and the plate to the plastic ski.

Figure 3:
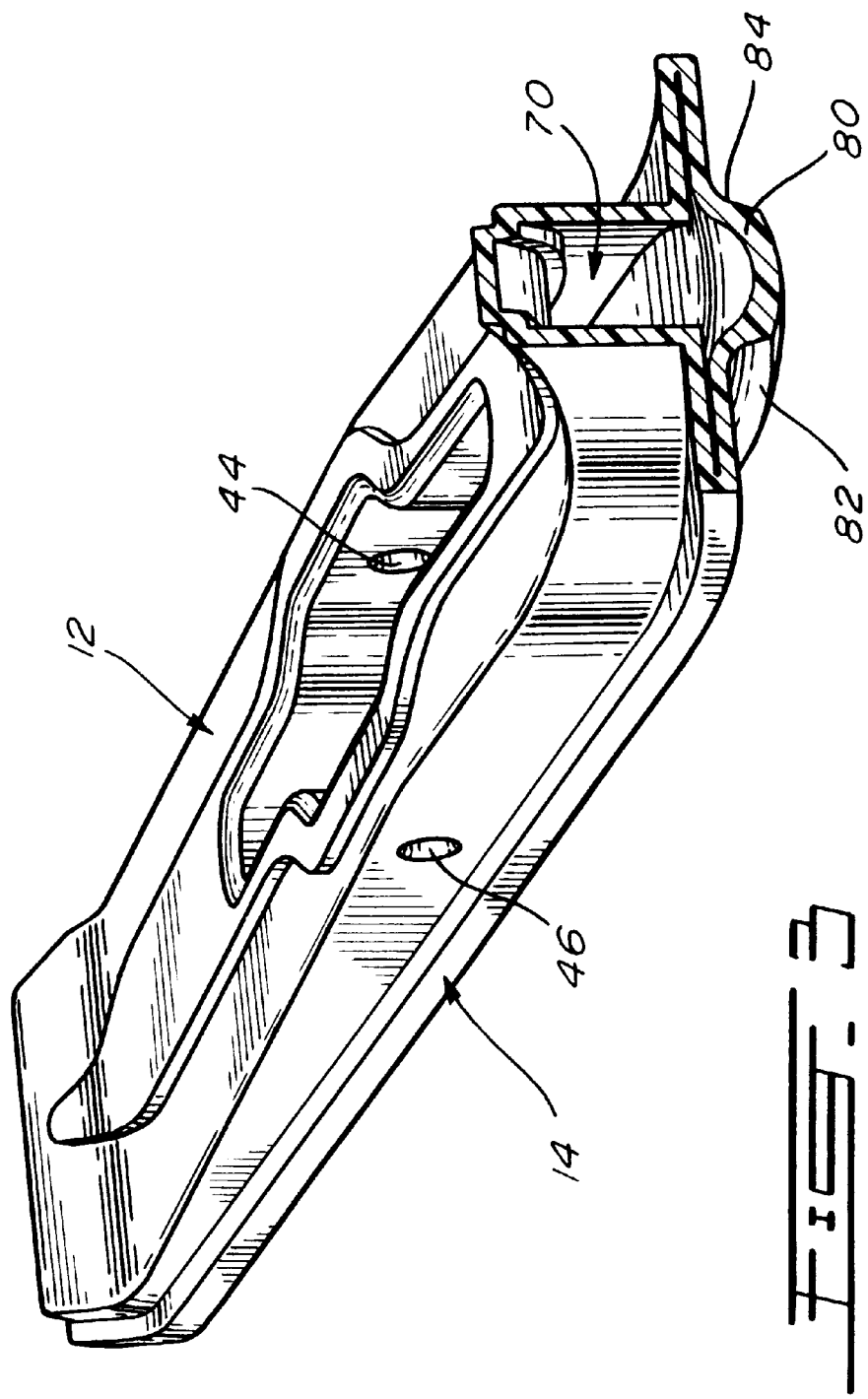
FIG. 3 is a cross sectional view taken along lines 3—3 of FIG. 1.

As can be seen in FIGS. 2, 3 and 4, the raised portions of the top wall 12 define hollow chambers, one of which is shown at the front end of the ski as 70, two of which are shown as 72 and 74 on each side of the recessed area 16, and a further, identified as 76, extending from the central recessed area 16 to the rear extremity 78 of the ski.

The bottom wall 14 has a longitudinal central downward projection 80 defining opposite outside steering surfaces 82 and 84 to the ski. The bottom surface of this projection includes the concave bar receiving surface 20 described above.

An additional feature of the ski of the present invention due to its blow molding making is the provision of an integral handle portion 86 at the forward end of the ski. As seen in FIG. 2, the handle is completely hollow with one area 88 integral with the front edge 90 of the ski and a rear area 92 defining a chamber 94 in communication with the chamber 70 of the central portion of the ski.

A preferred resin for the making of the ski of the present invention is polyethylene having a ultra high molecular weight. The tribologic features of this material, such as a coefficient of friction which is very low and a resistance to wear which is high, are known to be the best in the range of resins presently available on the market.

FIG. 1a shows another metal plate 118 which may be used in lieu of plate 18; it comprises a pair of ears 152 and 154, each having a hole 148, 150 allowing the plate to be secured to the ski. The bottom wall of the plate has a hole 167 to secure the plate to the threaded projection 66 of the wear bar.

Although the invention has been described above with respect with one specific form, it will be evident to a person skilled in the art that it may be modified and refined in various ways. Because of the high molecular weight and viscosity of polyethylene, only special grades can be used for blow molding; however, some blend of polyethylene with polyamide, for example, could be envisaged to form the body of the ski of the present invention. It is therefore wished to have it understood that the present invention should not be limited in scope, except by the terms of the following claims.

What is claimed is:

1. A ski used for the steering of a snowmobile comprising:
an elongated one-piece blow molded body formed of polyethylene; said body having a top wall and a bottom wall; said top wall having raised portions defining hollow sections with said bottom wall; said raised portions displaying a central recessed area adapted to receive therein the lower end of a snowmobile steering component; said recessed area defining opposite lateral sides; and first fixation hole means in said lateral sides for fixing said steering component to said ski.

2. A ski as defined in claim 1, wherein said body has a forward end and defines a hollow handle having one end integrally formed with said forward end and an opposite end extending from said hollow sections.

3. A ski as defined in claim 1, wherein said body is formed of ultra high molecular weight polyethylene.

4. A ski as defined in claim 1, comprising second fixation holes in a bottom face of said recessed area for fixing a wear bar to said bottom wall of said body.

5. A ski as defined in claim 4 wherein said bottom wall has a central longitudinally extending projection; said projection displaying an elongated concavity to receive therein said wear bar and defining opposite steering surfaces.

6. A ski used for the steering of a snowmobile comprising:
an elongated one-piece blow molded body formed of polyethylene; said body having a top wall and a bottom wall; said top wall having raised portions defining hollow sections with said bottom wall; said raised portions displaying a central area adapted to receive the lower end of a snowmobile steering component; said defining opposite lateral sides; and first fixation hole means in said lateral sides for fixing said steering component to said ski.

7. A ski used for the steering of a snowmobile, said ski comprising:
a one piece blow molded body formed of polyethylene;
said body having a top wall and a bottom wall integrally molded together;
said top wall being formed of raised portions with respect to the bottom wall, said raised portions defining hollow sections between the top and bottom walls;
said top wall including a central recessed area adapted to receive therein a steering component of the snowmobile;
said recessed area defining opposite sides, each side having a corresponding bolt hole for receiving a bolt to secure the steering component to the ski; and,
said hollow sections including a front hollow section located forward of the central recessed area, a rear hollow section located rearward of the central recessed area, a first side hollow section located on one side of the central recessed area, and a second side hollow section located on the opposite side of the central recessed area.

8. A ski as defined in claim 7, wherein the bottom wall further comprises an elongated, narrow concave surface for receiving therein a correspondingly elongated, narrow metallic wear bar.

9. A ski as defined in claim 8, wherein said elongated narrow concave surface on the bottom wall further comprises a first bottom recessed portion and a second bottom recessed portion for receiving therein first and second ends of the elongated, narrow metallic wear bar, respectively.

10. A ski as defined in claim 7, further comprising a plurality of bottom bolt holes in the elongated narrow concave surface, said bottom bolt holes extending through the top and bottom walls of the ski for receiving therein corresponding threaded projections on the wear bar for securing the wear bar to the ski.

11. A ski as defined in claim 7, further comprising a handle, said handle including a forward area integrally molded to a front edge of the ski, and a rearward area integrally molded to the portion of the top wall defining the forward hollow section.

12. A ski as defined in claim 7, wherein the body is formed of ultra high molecular weight polyethylene.

* * * * *